US012629945B2

(12) United States Patent
Aoki

(10) Patent No.: US 12,629,945 B2
(45) Date of Patent: May 19, 2026

(54) LIQUID DISCHARGE APPARATUS

(71) Applicant: Yuuta Aoki, Kanagawa (JP)

(72) Inventor: Yuuta Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 135 days.

(21) Appl. No.: 18/635,177

(22) Filed: Apr. 15, 2024

(65) Prior Publication Data

US 2024/0343046 A1 Oct. 17, 2024

(30) Foreign Application Priority Data

Apr. 17, 2023 (JP) ................................. 2023-067395

(51) Int. Cl.
| | |
|---|---|
| *B41J 2/325* | (2006.01) |
| *B41J 2/13* | (2006.01) |
| *B41J 2/21* | (2006.01) |
| *B41J 2/235* | (2006.01) |
| *B41J 29/393* | (2006.01) |
| *G01J 3/46* | (2006.01) |

(52) U.S. Cl.
CPC ................. *B41J 2/235* (2013.01); *B41J 2/13* (2013.01); *B41J 2/2114* (2013.01); *B41J 29/393* (2013.01); *G01J 3/46* (2013.01)

(58) Field of Classification Search
CPC ... B41J 2/235; B41J 2/13; B41J 2/2114; B41J 29/393; G01J 3/46
See application file for complete search history.

(56) References Cited

U.S. PATENT DOCUMENTS

| | | | |
|---|---|---|---|
| 2010/0328388 A1* | 12/2010 | Takekoshi | .............. B41J 2/2114 347/14 |
| 2015/0251445 A1* | 9/2015 | Sayama | ............... B41J 2/04581 347/16 |
| 2019/0118557 A1 | 4/2019 | Harada | |
| 2020/0079125 A1* | 3/2020 | Yasui | ....................... B41J 2/125 |
| 2022/0169056 A1 | 6/2022 | Aoki | |
| 2023/0016931 A1 | 1/2023 | Aoki et al. | |

FOREIGN PATENT DOCUMENTS

| | | |
|---|---|---|
| JP | 2009-220527 A | 10/2009 |
| JP | 2010-143175 A | 7/2010 |
| JP | 2010-201711 A | 9/2010 |
| JP | 2019-077169 A | 5/2019 |

* cited by examiner

*Primary Examiner* — Kristal Feggins
(74) *Attorney, Agent, or Firm* — IPUSA, PLLC

(57) ABSTRACT

A liquid discharge apparatus includes multiple liquid discharge heads, a medium mover, and circuitry. The multiple liquid discharge heads include a first liquid discharge head to discharge a treatment liquid onto a region of the medium and a second liquid discharge head to discharge a color liquid onto the region to paint the region, on which the treatment liquid is applied, in a predetermined color. The circuitry causes the first and second liquid discharge heads to form an evaluation chart. The evaluation chart includes patterns different in a combination of a first discharge amount of the treatment liquid and a second discharge amount of the color liquid. Further, the circuitry performs a setting of the first discharge amount with respect to the second discharge amount according to the coloring, and causes the second liquid discharge head to discharge the treatment liquid onto the region based on the setting.

9 Claims, 13 Drawing Sheets

FIG. 2A COMPARATIVE EXAMPLE
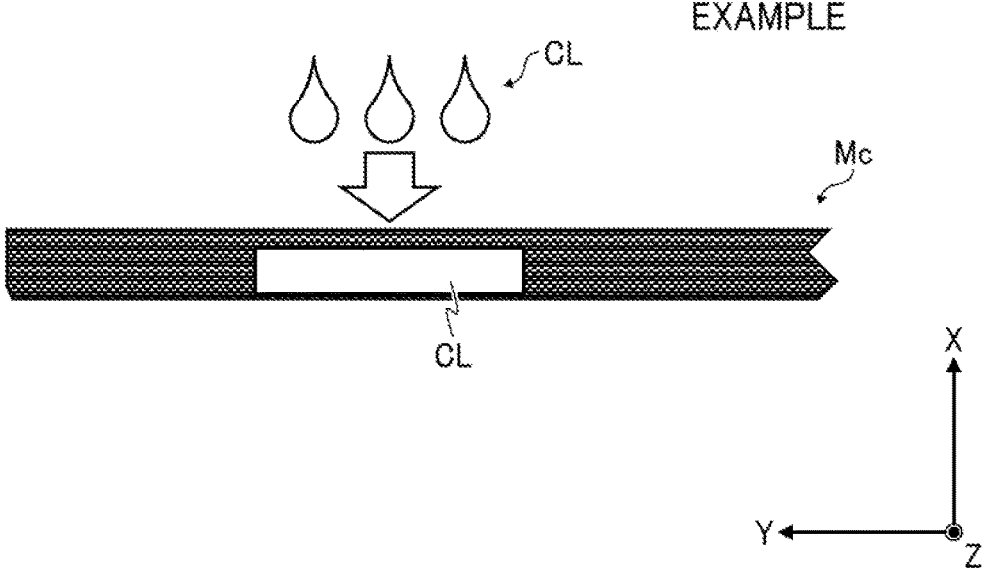
FIG. 2B
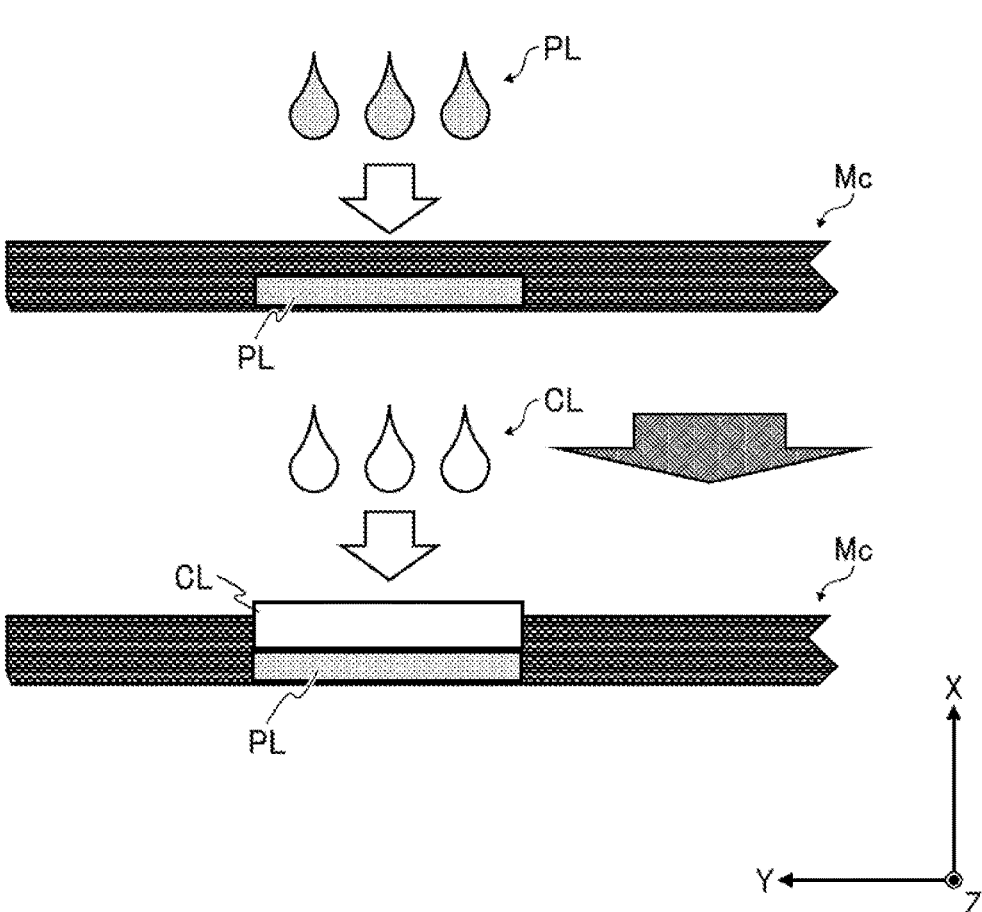

FIG. 4

LIQUID DISCHARGE APPARATUS

CROSS-REFERENCE TO RELATED APPLICATION

This patent application is based on and claims priority pursuant to 35 U.S.C. § 119 (a) to Japanese Patent Application No. 2023-067395, filed on Apr. 17, 2023, in the Japan Patent Office, the entire disclosure of which is hereby incorporated by reference herein.

BACKGROUND

Technical Field

Embodiments of the present disclosure relate to a liquid discharge apparatus.

Related Art

In the related art, a liquid discharge apparatus performs a liquid discharge operation in which a liquid is discharged onto a medium based on operation instruction information generated by, for example, an information processing apparatus. The liquid discharge apparatus also functions as an image forming apparatus that forms an image on the medium. The liquid discharge apparatus includes a liquid discharge head as a configuration for discharging the liquid onto the medium, and is typically referred to as an inkjet printer.

Currently, various types of media are used in inkjet printers. For example, a direct to garment (DTG) printer can use a fabric (cloth), such as a garment (e.g., a T-shirt), as a medium.

When a fabric (which may be referred to as a "fabric medium" in the following description) is used as a medium, in particular, in order to form a color image, white liquid ink is adhered (applied) to a specific region of the fabric medium to lay a foundation, and then liquid inks of multiple colors for the color image are adhered (applied) to the fabric medium in an image forming process. The specific region is a region for forming an image and may be referred to as an "image forming region" in the following description. In this case, a treatment liquid that affects the aggregation and diffusion of the liquid ink may be applied and adhered to the fabric medium before image formation to appropriately adjust an adhesion amount of the white liquid ink on the fabric medium. This process is referred to as "pretreatment" for the sake of convenience. The treatment liquid used for the pretreatment is referred to as a "pretreatment liquid."

An appropriate application amount of the pretreatment liquid is applied to a medium, and an appropriate adhesion amount of the white liquid ink is adhered to the image forming region on the medium. Such a medium contributes to the optimization of image density of the image formed thereon to enhance the image quality of the formed image.

SUMMARY

Embodiments of the present disclosure describe an improved liquid discharge apparatus that includes multiple liquid discharge heads, a medium mover, and circuitry. The multiple liquid discharge heads discharge a liquid onto a medium. The multiple liquid discharge heads include a first liquid discharge head to discharge a treatment liquid onto a region of the medium and a second liquid discharge head to discharge a color liquid onto the region of the medium to paint the region of the medium, on which the treatment liquid is applied by the first liquid discharge head, in a predetermined color. A coloring of the predetermined color is affected by the treatment liquid. The medium mover moves at least one of the multiple liquid discharge heads or the medium relative to each other. The circuitry causes the first liquid discharge head and the second liquid discharge head to form an evaluation chart on the region of the medium. The evaluation chart includes patterns different in a combination of a first discharge amount of the treatment liquid and a second discharge amount of the color liquid. Further, the circuitry performs a setting of the first discharge amount of the treatment liquid with respect to the second discharge amount of the color liquid according to the coloring of the predetermined color in the evaluation chart, and causes the second liquid discharge head to discharge the treatment liquid onto the region of the medium based on the setting.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2A is a diagram illustrating a medium painted with color liquid according to a comparative example;

FIG. 2B is a diagram illustrating a medium painted with treatment liquid and color liquid according to an embodiment of the present disclosure;

FIG. 4 is a block diagram of a controller of a liquid discharge apparatus according to an embodiment of the present disclosure;

Figure 1A:
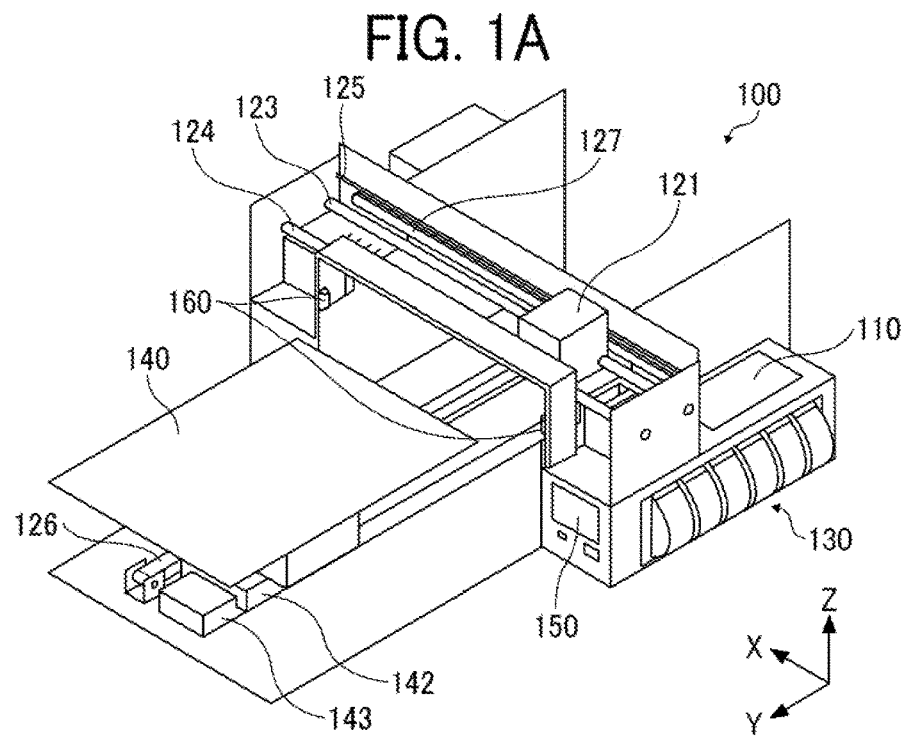
FIG. 1A is a schematic perspective view of a liquid discharge apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Liquid Discharge Apparatus

A liquid discharge apparatus according to an embodiment of the present disclosure is described below with reference to the drawings. A liquid discharge operation performed in the liquid discharge apparatus according to the present embodiment can be applied to various types of media. Examples of the media include paper, fabric, wood, or construction materials. In the following description, a DTG printer for a fabric medium according to the present embodiment is described.

Figure 1B:
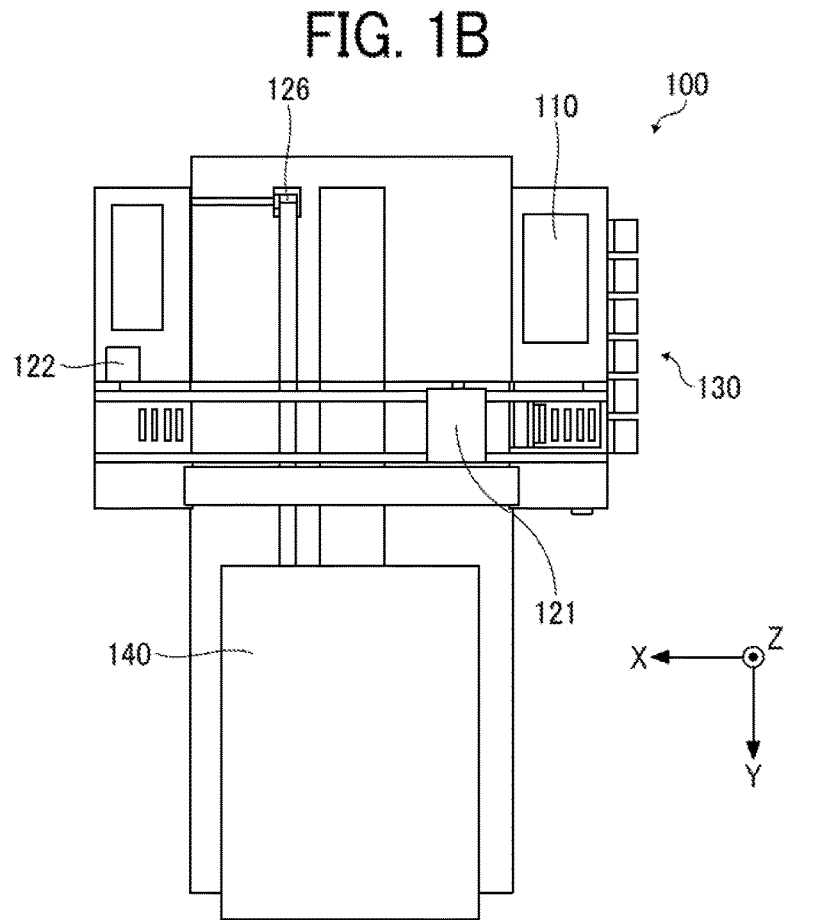
FIG. 1B is a schematic plan view of the liquid discharge apparatus of FIG. 1A.
Figure 1C:
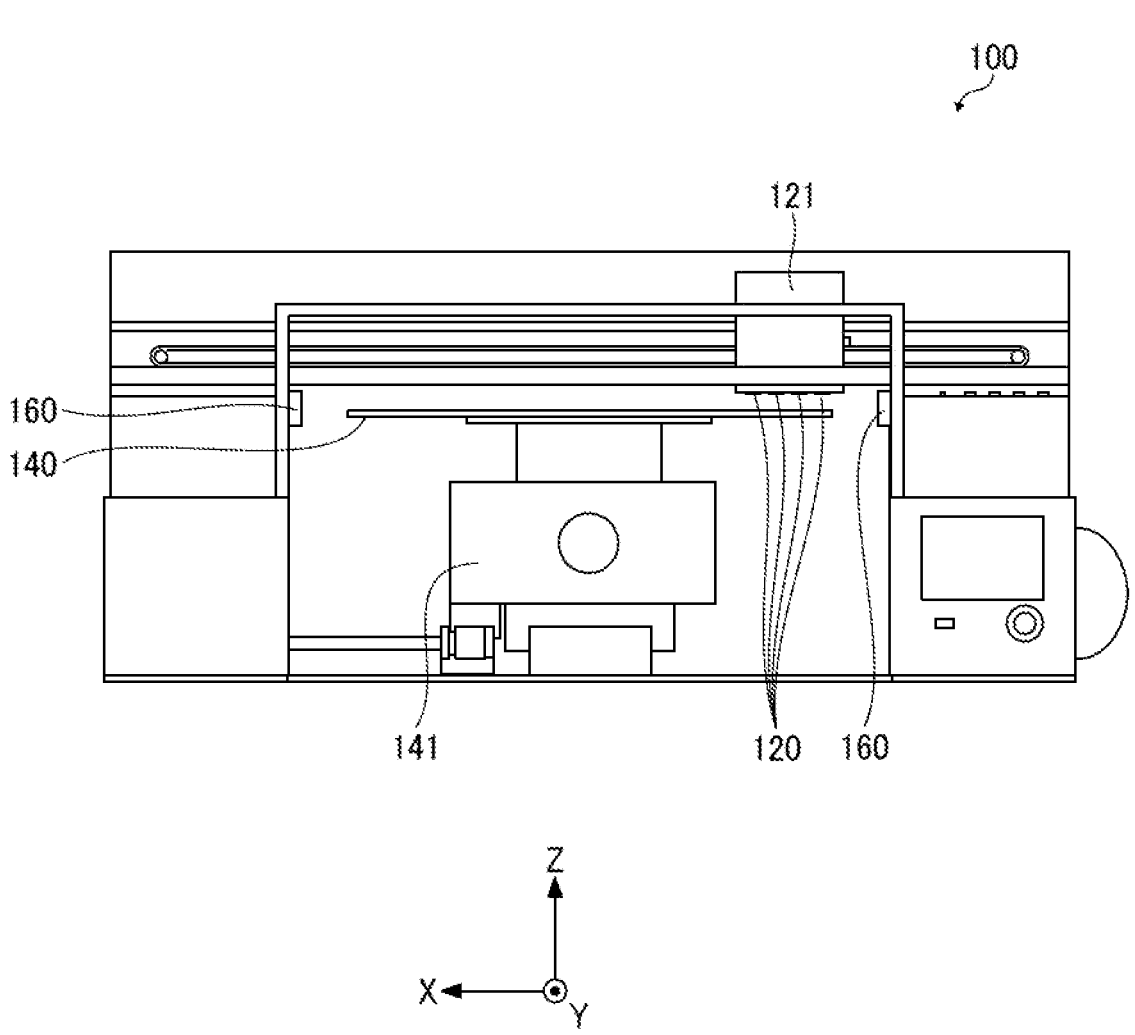
FIG. 1C is a schematic front view of the liquid discharge apparatus of FIG. 1A.

As illustrated in FIGS. 1A to 1C, an inkjet printer 100 according to the present embodiment is a serial type inkjet garment printer. The inkjet printer 100 corresponds to an image forming apparatus that forms an image on the fabric medium. FIG. 1A is a perspective view of the inkjet printer 100, FIG. 1B is a plan view of the inkjet printer 100, and FIG. 1C is a front view of the inkjet printer 100.

In the following description and drawings, the coordinate axes illustrated in FIG. 1 are used in common. The Z axis corresponds to the height direction of the inkjet printer 100. The X direction corresponds to a sliding direction of a liquid discharge head 120 of the inkjet printer 100. The Y direction corresponds to a moving direction of a platen 140. The Y direction indicated by the arrow in FIG. 1A is directed toward the front of the inkjet printer 100.

The inkjet printer 100 includes a controller board 110. The controller board 110 processes outputs of driving sources, such as a motor and a solenoid, and signals (detection signals) output from various sensors to execute a control process so as to cause various structures to perform predetermined operations. The configuration of the controller board 110 will be described in detail later. The inkjet printer 100 is controlled based on software executable by a controller 10 (see FIG. 4) mounted on the controller board 110.

For example, the controller 10 of the inkjet printer 100 receives instruction information (print data) generated by an external information processing apparatus (such as a personal computer), and executes an image forming process based on the instruction information (print data). For example, the controller 10 reads the instruction information (print data) stored in a universal serial bus (USB) memory inserted into an input interface for a recording medium via the input interface to execute the image forming process.

The inkjet printer 100 includes multiple liquid discharge heads 120. The liquid discharge heads 120 are mounted on a carriage 121. The carriage 121 is controlled by the controller 10 to reciprocate (slide) in a predetermined section in the X-axis direction.

One liquid discharge head 120 among the multiple liquid discharge heads 120 discharges a color liquid CL as liquid ink of a specific color onto the medium so as to color (paint) the medium with the liquid of the specific color used to form an image on the medium. Another liquid discharge head 120 discharges a pretreatment liquid which is adhered in advance to a region of the medium to be colored with the color liquid CL to obtain the desired coloring of the color liquid CL adhered to the medium. A treatment liquid PL as the pretreatment liquid affects the degree of coloring of the color liquid CL adhered to the medium. Typically, the color liquid CL is adhered to the medium after the treatment liquid PL is adhered to the medium to enhance the coloring of the color liquid CL.

The liquid discharge heads 120 for discharging the color liquid CL and the treatment liquid PL are mounted on the carriage 121. The controller 10 controls the operation of a main scanning motor 122 to drive a main scanning timing belt 127. Thus, the carriage 121 slides along a main guide rod 123 and a sub guide rod 124. An encoder sheet 125 is disposed in parallel with the main guide rod 123 and the sub guide rod 124. A sensor mounted on the carriage 121 reads the encoder sheet 125 to determine the direction and amount of movement of the carriage 121. The encoder sheet 125 includes slits formed or printed periodically in the sliding direction of the carriage 121.

When the sensor reads the encoder sheet 125, a detection signal indicating the result of reading is transmitted to the controller 10, and thus the controller 10 determines the direction and amount of movement of the carriage 121. The liquid discharge operation is performed at a predetermined discharge position at a predetermined timing.

As described above, the multiple liquid discharge heads 120 are mounted on the carriage 121. In the present embodiment, since the four liquid discharge heads 120 are mounted on the carriage 121 as illustrated in FIG. 1C. One of the liquid discharge heads 120 discharges the treatment liquid PL. Each of the liquid discharge heads 120 includes two nozzle rows in each of which multiple nozzles are arrayed in the sub-scanning direction. An ink tank for temporarily storing liquid (e.g., the color liquid CL for coloring and the treatment liquid PL) to be discharged is disposed directly above the liquid discharge head 120 mounted on the carriage 121.

The ink tank of the liquid discharge head 120 is coupled to an ink cartridge 130 via an ink supply tube and an ink supply pump. The ink supply pump is operated to supply the color liquid CL and the treatment liquid PL from the ink cartridge 130 to the ink tank, if desired.

When a fabric Mc (e.g., a T-shirt) is used as an image forming target (medium) on which an image is formed according to the present embodiment, the fabric Mc is secured to the platen 140. The platen 140 is mounted on a platen elevator 141 to adjust the position of the platen 140 in the height direction (Z-axis direction). The platen elevator 141 is mounted on a sub-scanning slider 142.

The sub-scanning slider 142 is movably supported along a sub-scanning guide rail 143. The controller board 110 and a sub-scanning drive mechanism cause a sub-scanning timing belt 126 to rotate to move the sub-scanning slider 142 in the sub-scanning direction (Y direction).

The procedure of the image forming process after the fabric Mc is set on the platen 140 will be described below. Examples of the fabric Mc include a T-shirt. The T-shirt is set on the platen 140 of the inkjet printer 100, and then an operation panel 150 is operated to perform a slider operation. The slider operation corresponds to an operation of completely pulling the platen 140 toward the rear of the inkjet printer 100 in the Y direction. By the slider operation, the position of the image forming region of the T-shirt reaches the position where the color liquid CL is discharged and landed by the liquid discharge head 120.

When the slider operation is performed, a height sensor 160 detects whether the T-shirt set on the platen 140 is to collide with the liquid discharge head 120. When the height sensor 160 detects that the T-shirt is to collide with the liquid discharge head 120, the slider operation of the platen 140 is stopped, or the platen 140 is moved forward in the Y direction and returned to a position (medium setting position) where the T-shirt is set to reset the T-shirt.

After the slider operation of the platen 140 is normally performed, the inkjet printer 100 is in a "standby state" in which the inkjet printer 100 waits for the reception of the operation instruction information (print data). The operation instruction information may be stored in a storage area of the controller board 110 in advance. In this case, the operation instruction information is selected by operating the operation panel 150 to start the image forming process.

As the inkjet printer 100 starts the image forming process, the slider (i.e., the platen 140) moves to a printing start position. Then, the main scanning motor 122 is driven to rotate the main scanning timing belt 127 to move the carriage 121. Subsequently, the carriage 121 secured to the main scanning timing belt 127 moves in the sliding direction by an amount of movement corresponding to the unit of the slits formed in the encoder sheet 125, and a predetermined liquid discharge operation is performed at the position to which the carriage 121 has moved.

The platen 140 moves toward the front side of the inkjet printer 100 in accordance with the timing after the carriage 121 slides in a predetermined direction and performs the liquid discharge operation. This amount of movement of the platen 140 is suitable for the image forming process. Accordingly, the liquid discharge head 120 moves to the next image forming position relative to the T-shirt set on the platen 140.

After the platen 140 moves, the liquid discharge head 120 moves in the sliding direction to perform the predetermined liquid discharge operation. Such a liquid discharge operation and movement of the platen 140 is repeated to perform the image forming process on the image forming region of the T-shirt on the platen 140. When the image forming process is completed, the platen 140 is ejected to the front side of the inkjet printer 100 (Y direction).

Relation Between Liquid Ink and Pretreatment Liquid

The degree of coloring due to the correlation between the discharge amount of the color liquid CL and the discharge amount of the treatment liquid PL, which are adhered to the fabric Mc, by the inkjet printer 100 will be described below with reference to FIGS. 2A to 3B.

As illustrated in FIG. 2A, even if the color liquid CL is discharged onto the fabric Mc to which the treatment liquid PL is not adhered, the color liquid CL permeates into the fabric Mc from the surface thereof, and the degree of coloring of the color liquid CL does not become a desired state.

In the present embodiment, as illustrated in FIG. 2B, the color liquid CL is discharged onto the fabric Mc after the treatment liquid PL is adhered to the fabric Mc. As a result, the color liquid CL appears on the surface of the fabric Mc in a desired state, and the degree of coloring is in a desired state.

Figure 3A:
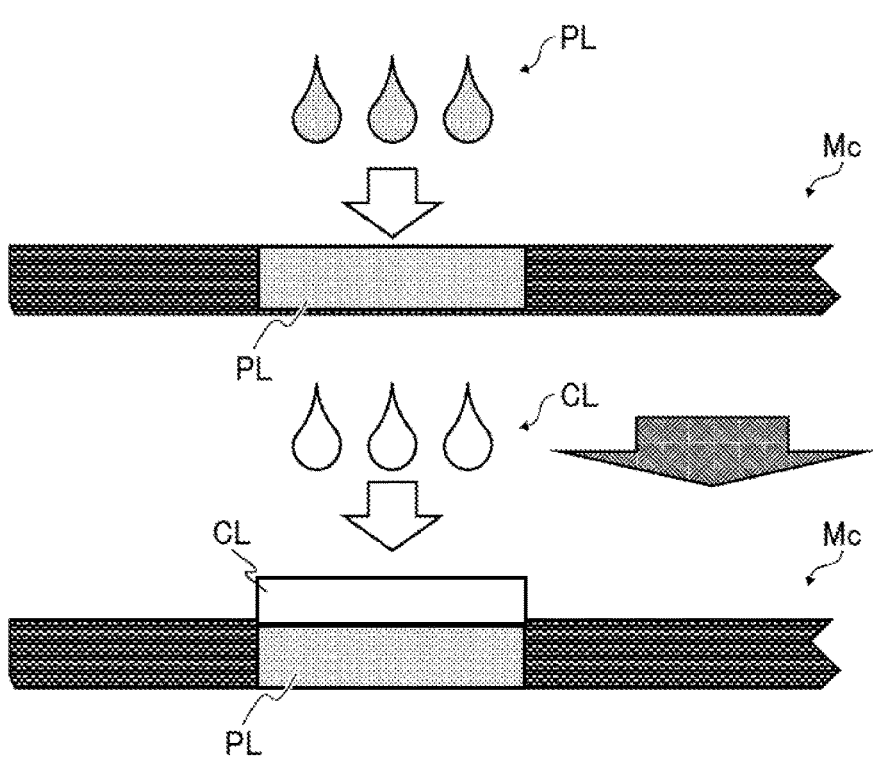
FIGS. 3A and 3B are diagrams each illustrating a medium painted with treatment liquid and color liquid according to an embodiment of the present disclosure.

As illustrated in FIG. 3A, if the amount of the treatment liquid PL is too large, the color liquid CL is less likely to permeate into the fabric Mc, and the color liquid CL is solidified in a film shape on the surface of the fabric Mc. In this case, the coloring of the color liquid CL is good. However, in terms of the fastness of the image, the solidified color liquid CL may peel off from the fabric Mc or crack on the fabric Mc due to rubbing, for example, when the fabric Mc is washed.

Figure 3B:
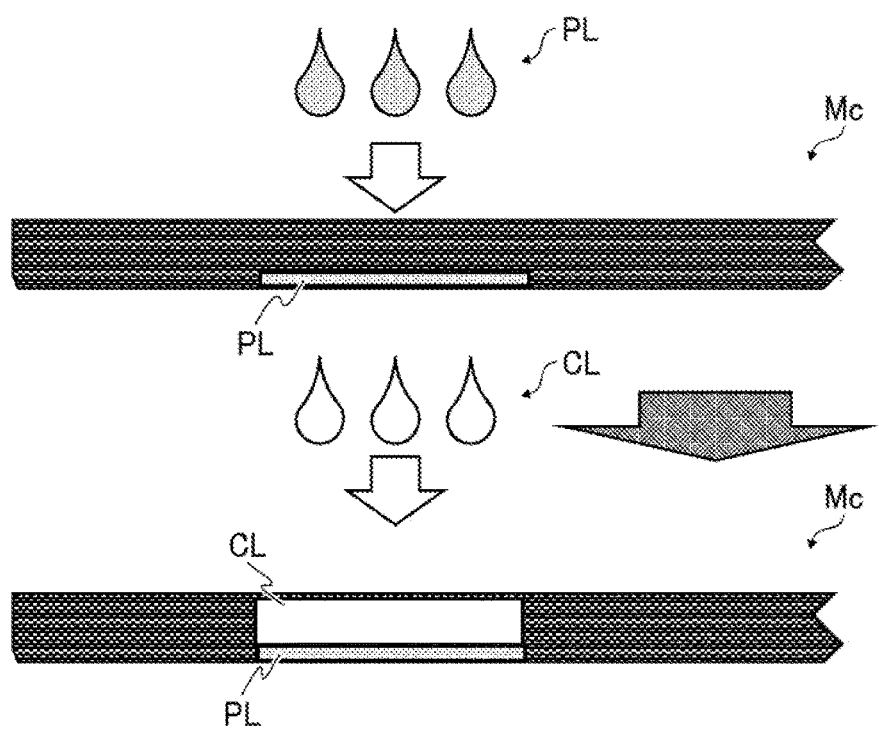

As illustrated in FIG. 3B, if the amount of the treatment liquid PL is too small, the color liquid CL is likely to excessively permeate into the fabric Mc, and thus the coloring of the color liquid CL is insufficient on the surface of the fabric Mc.

Accordingly, it is difficult to obtain a desired coloring state on the various types of fabrics Mc without controlling the discharge amount of the treatment liquid PL in accordance with the degree of permeation of the color liquid CL into the fabric Mc.

Configuration of Control Block

Figure 4:
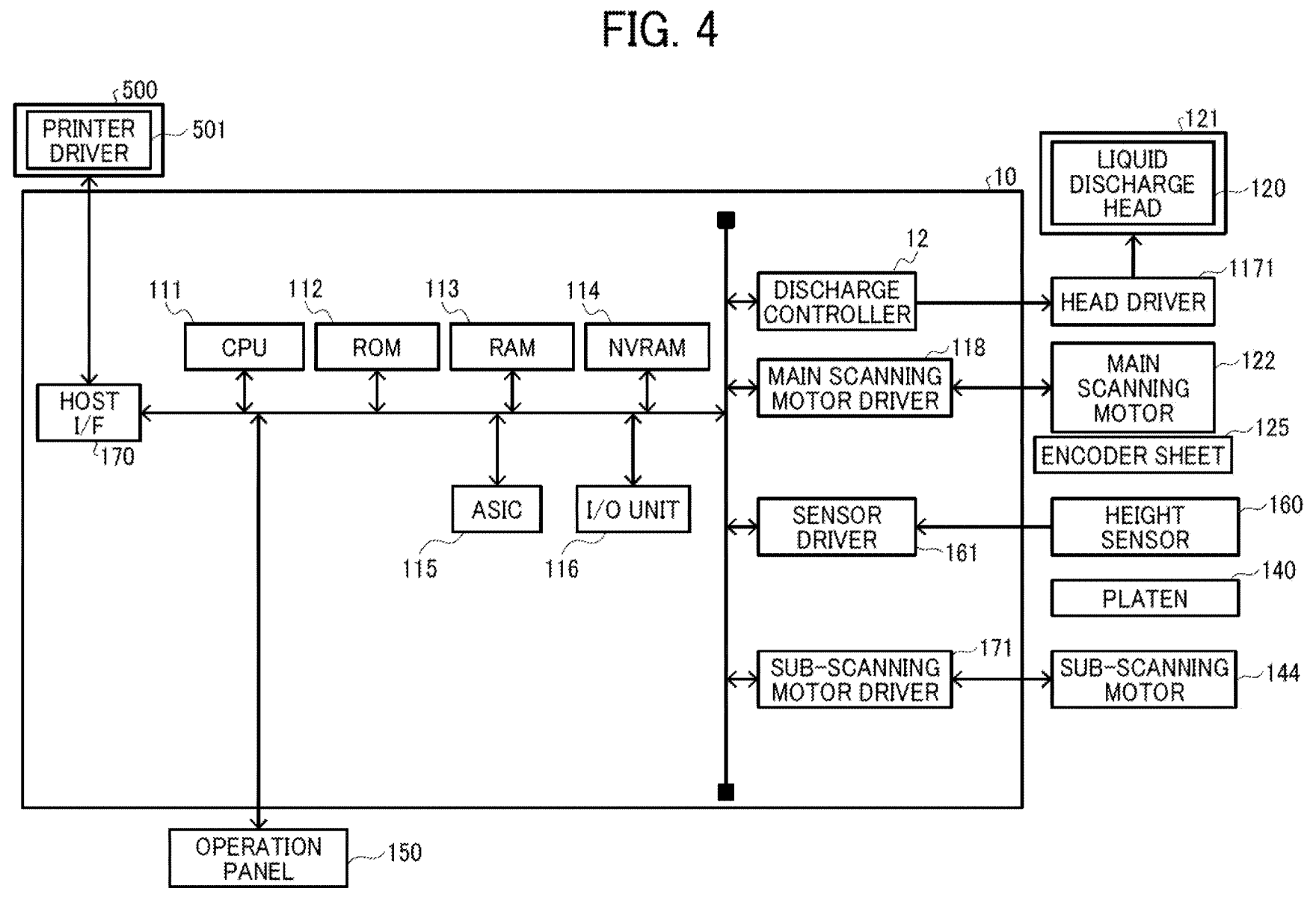

A configuration of a control block of the inkjet printer 100 according to the present embodiment will be described below with reference to FIG. 4. As illustrated in FIG. 4, the controller 10 as a control block of the inkjet printer 100 includes a central processing unit (CPU) 111, a read-only memory (ROM) 112, a random-access memory (RAM) 113, a nonvolatile random-access memory (NVRAM) 114, and an application-specific integrated circuit (ASIC) 115.

The CPU 111 is connected to the operation panel 150 as an operation display unit for inputting and displaying information for the inkjet printer 100, and controls the operation of each functional component of the inkjet printer 100. The CPU 111 also has functions of controlling a conveyance operation of the platen 140 in the sub-scanning direction, a movement operation of the carriage 121 in the main scanning direction, and the liquid discharge operation by the liquid discharge head 120.

The CPU 111 receives a detection signal from the height sensor 160 via a sensor driver 161 during the slider operation, and determines whether the height of the fabric Mc is within an appropriate range.

The ROM 112 is a non-volatile storage medium that stores programs executed by the CPU 111 and other fixed data. The controller 10 described later is implemented by executing the programs stored in the ROM 112 by the arithmetic processing function of the CPU 111.

The RAM 113 temporarily stores, for example, image data used for the image forming process. The RAM 113 also functions as a work area when a program controller is implemented.

The NVRAM 114 is a rewritable non-volatile storage medium that can retain data even while the inkjet printer 100 is powered off.

The ASIC 115 performs image processing, such as various signal processing and sorting on image data, and processing of input and output signals for controlling the entire of the inkjet printer 100.

The controller 10 further includes a host interface (I/F) 170, a discharge controller 12, a main scanning motor driver 118, the sensor driver 161, a sub-scanning motor driver 171, and an input/output (I/O) unit 116.

The host I/F 170 transmits and receives data and control signals to and from a host, such as a printer driver 501 of an external apparatus 500.

The discharge controller 12 generates a drive waveform to drive the liquid discharge heads 120 and outputs the image data for selectively driving pressure generators of the liquid discharge heads 120 and various types of data associated with the image data to a head driver 1171.

The main scanning motor driver 118 drives the main scanning motor 122.

The sensor driver 161 controls the operation of the height sensor 160. The sensor driver 161 receives a detection signal detected by the height sensor 160 and passes the detection signal to a functional block implemented by information processing executed in, for example, the CPU 111.

The sub-scanning motor driver 171 drives the sub-scan motor 144 to move the platen 140 in the sub-scanning direction.

The I/O unit 116 receives detection signals from various sensors for the operation of the inkjet printer 100.

The controller 10 receives an image forming instruction related to the image forming process from the printer driver 501 of the external apparatus 500 via a cable or a network by the host I/F 170. The printer driver 501 of the external apparatus 500 generates the image forming instruction. The external apparatus 500 has a host function of an information processing apparatus such as a personal computer (PC), an image reading device such as an image scanner, and an image capture such as a digital camera.

As the controller 10 receives the image forming instruction, the CPU 111 reads and analyzes the image forming instruction in the reception buffer of the host I/F 170. The ASIC 115 performs, for example, desired image processing and data-sorting processing and transfers the image forming instruction to the discharge controller 12 according to an analysis result of the CPU 111. The discharge controller 12 outputs the image data and the drive waveform to the head driver 1171 at a predetermined timing. Dot pattern data for image output may be generated by storing font data in, for example, the ROM 112. The printer driver 501 may develop the image data into bitmap data and transfer to the inkjet printer 100 to generate the dot pattern data. In the present embodiment, for example, it is assumed that the printer driver 501 generates the dot pattern data for image output. According to the above, the image forming instruction corresponds to discharge instruction information.

A drive waveform generator of the discharge controller 12 includes a digital-to-analog (D/A) converter and an amplifier. The D/A converter converts pattern data of drive pulses stored in the ROM 112 and read by the CPU 111 from digital data to analog data. The drive waveform generator of the discharge controller 12 outputs the drive waveform including one drive pulse or multiple drive pulses to the head driver 1171. The head driver 1171 drives the liquid discharge head 120 based on the image data (dot pattern data) corresponding to one line printed by the liquid discharge head 120 serially input to the head driver 1171. The head driver 1171 selectively applies the drive pulses of the drive waveform received from the drive waveform generator of the discharge controller 12 to the pressure generator of the liquid discharge head 120.

The head driver 1171 includes, for example, a shift register to which a clock signal and serial data as image data are input, and a latch circuit that latches a resist value of the shift register by a latch signal. In addition, the head driver 1171 includes a level conversion circuit (level shifter) that changes the level of the output value of the latch circuit and an analog switch array (switch) that is controlled to be turned on or turned off by the level shifter. Functionally, for example, the head driver 1171 controls turning ON or turning OFF of the analog switch array to selectively apply a desired drive pulse in the drive waveform to the pressure generator of the liquid discharge head 120.

The image forming instruction (operation instruction information) includes information indicating the type of fabric Mc. The inkjet printer 100 according to the present embodiment has a function of selecting and setting the amount of the treatment liquid PL corresponding to the discharge amount of the color liquid CL, according to the type of fabric Mc placed on the platen 140.

Functional Configuration of Controller

Figure 5:
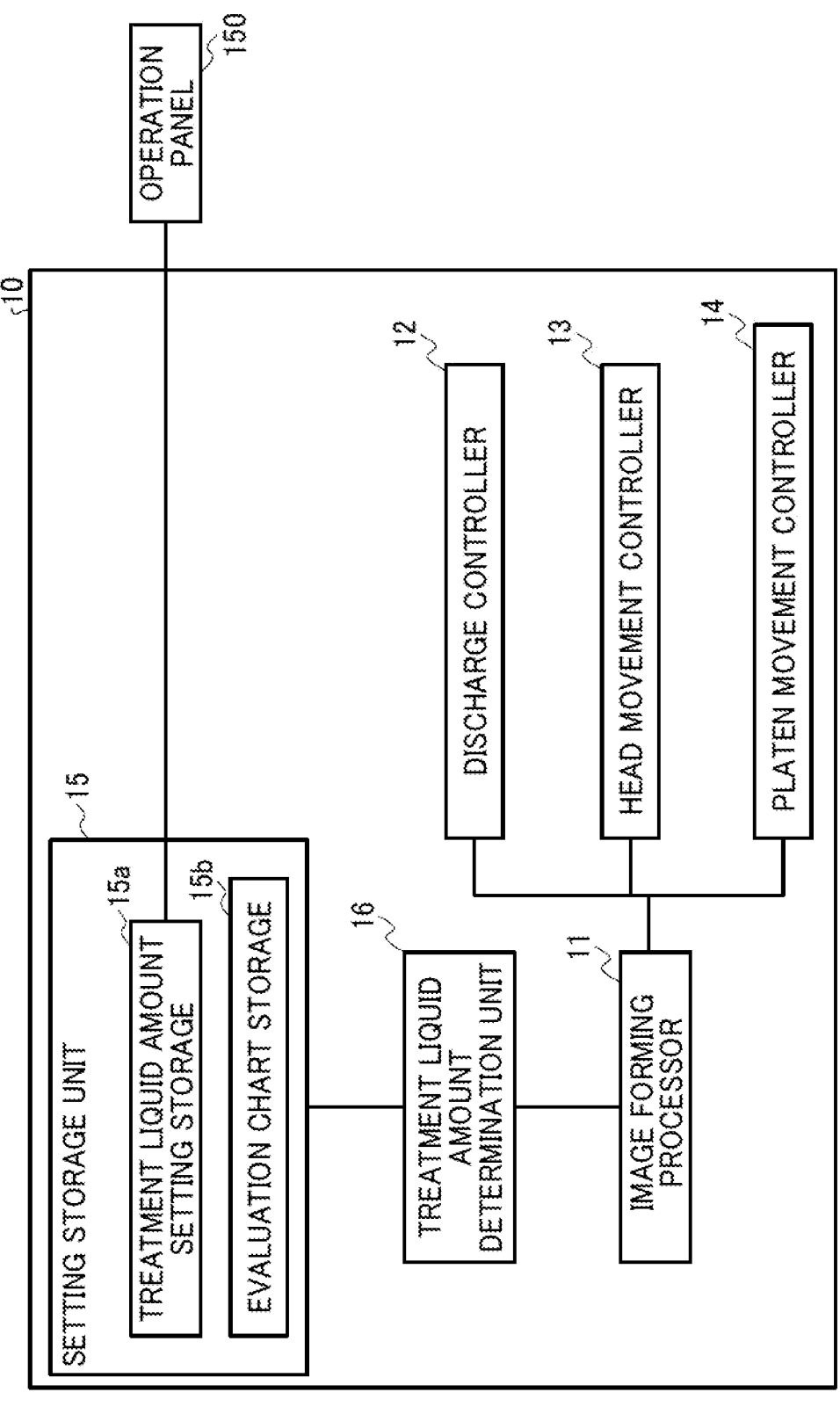
FIG. 5 is a functional block diagram illustrating a functional configuration of a controller according to an embodiment of the present disclosure.

Functional blocks that can be implemented in the controller 10 as the control block of the inkjet printer 100 will be described below with reference to FIG. 5. As illustrated in FIG. 5, the controller 10 includes an image forming processor 11, the discharge controller 12, a head movement controller 13, a platen movement controller 14, a setting storage unit 15, and a treatment liquid amount determination unit 16.

The image forming processor 11 generates image data for image formation based on the image forming instruction from the external apparatus 500, and instructs the discharge controller 12, the head movement controller 13, and the platen movement controller 14 to form an image on the fabric Mc using the image data.

The image forming processor 11 generates an evaluation chart CE, which will be described later, based on data indicating an increase or decrease in an application amount of the pretreatment liquid that can be acquired from the treatment liquid amount determination unit 16. In other words, the image forming processor 11 generates an instruction for controlling the operation of the liquid discharge head 120 that discharges the treatment liquid PL based on a setting value. The setting value is determined as the optimal amount of the treatment liquid PL corresponding to the discharge amount of the color liquid CL (determined based on the image data). In other words, the image forming processor 11 corresponds to an evaluation chart generation unit.

The discharge controller 12 drives the head driver 1171 based on the instruction from the image forming processor 11, and causes the liquid discharge head 120 to discharge a predetermined amount of the treatment liquid PL or the color liquid CL at a predetermined timing. In other words, the discharge controller 12 controls the operations of the liquid discharge heads 120 as a color liquid discharge unit and a treatment liquid discharge unit.

The head movement controller 13 causes the main scanning motor driver 118 to drive the main scanning motor 122 based on an instruction from the image forming processor 11 to move the carriage 121 in the main scanning direction.

The platen movement controller 14 as a medium moving unit causes the sub-scanning motor driver 171 to drive the sub-scanning motor 144 based on an instruction from the image forming processor 11 to move the platen 140 in the sub-scanning direction. Thus, the fabric Mc on the platen 140 is moved in the sub-scanning direction. In the present embodiment, the main scanning motor driver 118, the main scanning motor 122, the sub-scanning motor driver 171, and the sub-scanning motor 144 construct a medium mover that moves the liquid discharge head 120 and the fabric Mc on the platen 140 relative to each other.

The setting storage unit 15 includes a treatment liquid amount setting storage 15a that stores the setting value of the treatment liquid PL and an evaluation chart storage 15*b* that stores data for forming the evaluation chart CE to be described later. The treatment liquid amount setting storage 15*a* stores data of the discharge amount of the treatment liquid PL for controlling the discharge amount of the treatment liquid PL in accordance with (in correspondence with) the discharge amount of the color liquid CL, as described later. The treatment liquid amount setting storage 15*a* updates and stores the setting value of the amount of the treatment liquid PL based on the setting value input via the operation panel 150.

The treatment liquid amount determination unit 16 reads the setting value from the treatment liquid amount setting storage 15*a* in accordance with the information indicating the type of fabric Mc included in the operation instruction information, and sets data of the discharge amount of the treatment liquid PL corresponding to the color liquid CL based on the image data included in the operation instruction information in the image forming processor 11. The image forming processor 11 causes the discharge controller 12 to execute discharge control of the treatment liquid PL based on the data set by the treatment liquid amount determination unit 16.

First Embodiment

A discharge amount setting process according to a first embodiment of the present disclosure will be described below with reference to the flowchart of FIG. 6. The discharge amount setting process can be executed in the inkjet printer 100 as the liquid discharge apparatus according to embodiments of the present disclosure. In the discharge amount setting process, the color liquid CL is actually discharged onto the fabric Mc, and the coloring of the color liquid CL is checked to determine the optimal discharge amount of the treatment liquid PL.

Figure 6:
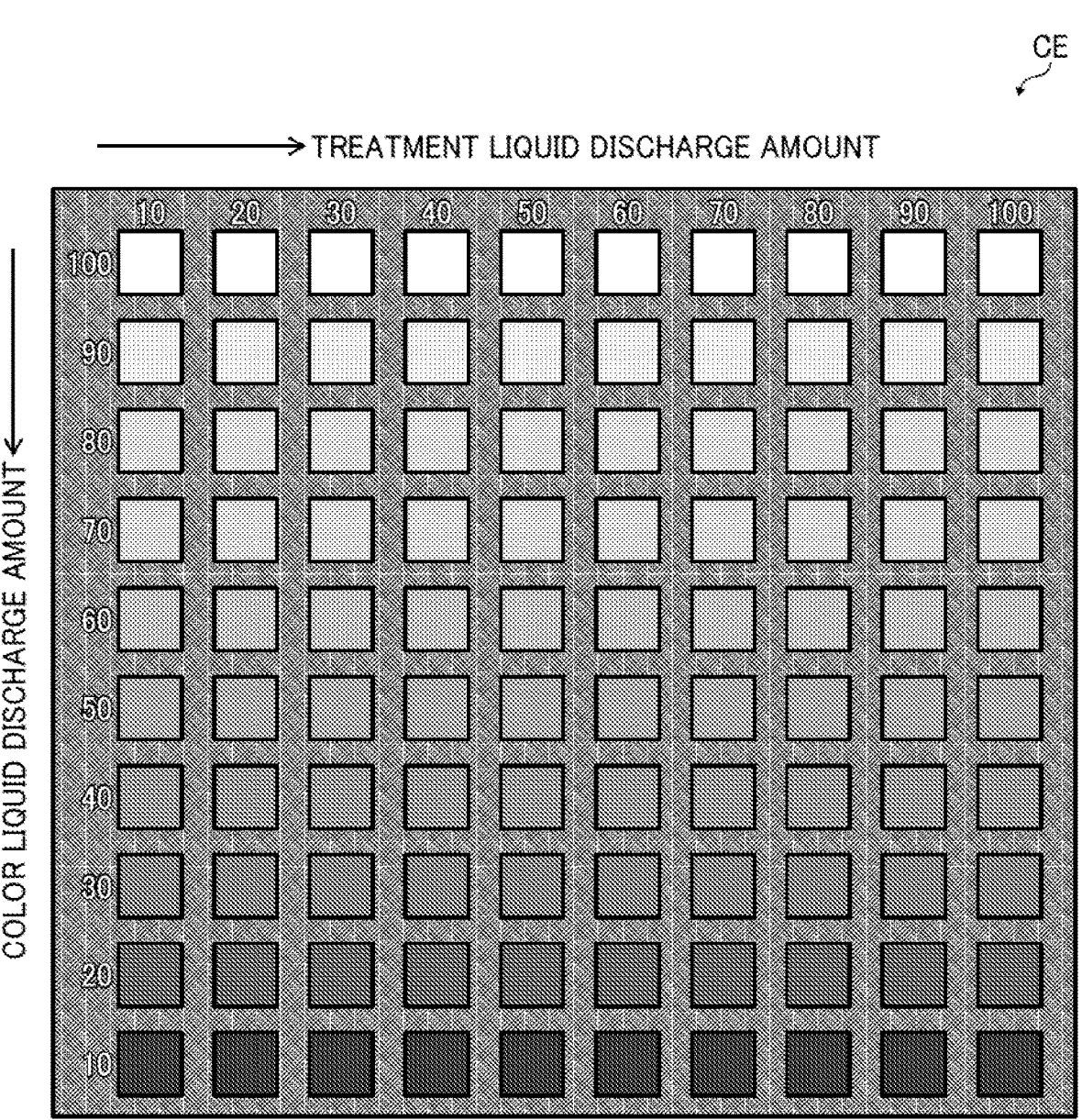
FIG. 6 is a diagram illustrating an evaluation chart according to an embodiment of the present disclosure.

FIG. 6 is a diagram illustrating the evaluation chart CE formed on the fabric Mc based on the data stored in the evaluation chart storage 15*b* of the setting storage unit 15, according to the present embodiment. The evaluation chart CE is a kind of image formed on the fabric Mc in the image forming process. In the evaluation chart CE, the image forming region is divided into multiple individual regions, into each of which the color liquid CL adheres to form rectangular patterns.

The individual regions are different in the combination of the discharge amount of the color liquid CL and the discharge amount of the treatment liquid PL. For example, in FIG. 6, the degree of the discharge amount of the color liquid CL is changed in the vertical direction, and the degree of the discharge amount of the treatment liquid PL is changed in the horizontal direction in the evaluation chart CE. In terms of the degrees of the respective discharge amounts, for example, the discharge amount of the color liquid CL that colors the rectangular pattern in the coloring of (255.255.255) of red, green, and blue (RGB) color scale is 100% in the evaluation chart CE. The upper limit of the discharge amount of the treatment liquid PL by the liquid discharge head 120 is 100% in the evaluation chart CE.

FIG. 6 illustrates a tendency of the coloring in the evaluation chart CE when the fabric Mc is black and the color liquid CL is white. In the evaluation chart CE, the discharge amount of the color liquid CL is changed with respect to the discharge amount of the treatment liquid PL that is changed. When the discharge amount of the white ink is the same, the larger discharge amount of the treatment liquid PL enhances the coloring in the individual region of the evaluation chart CE to form a brighter image. In FIG. 6, when the discharge amount of the treatment liquid PL is the same, the large discharge amount of the white ink enhances the coloring in the individual region of the evaluation chart CE.

Figure 7:
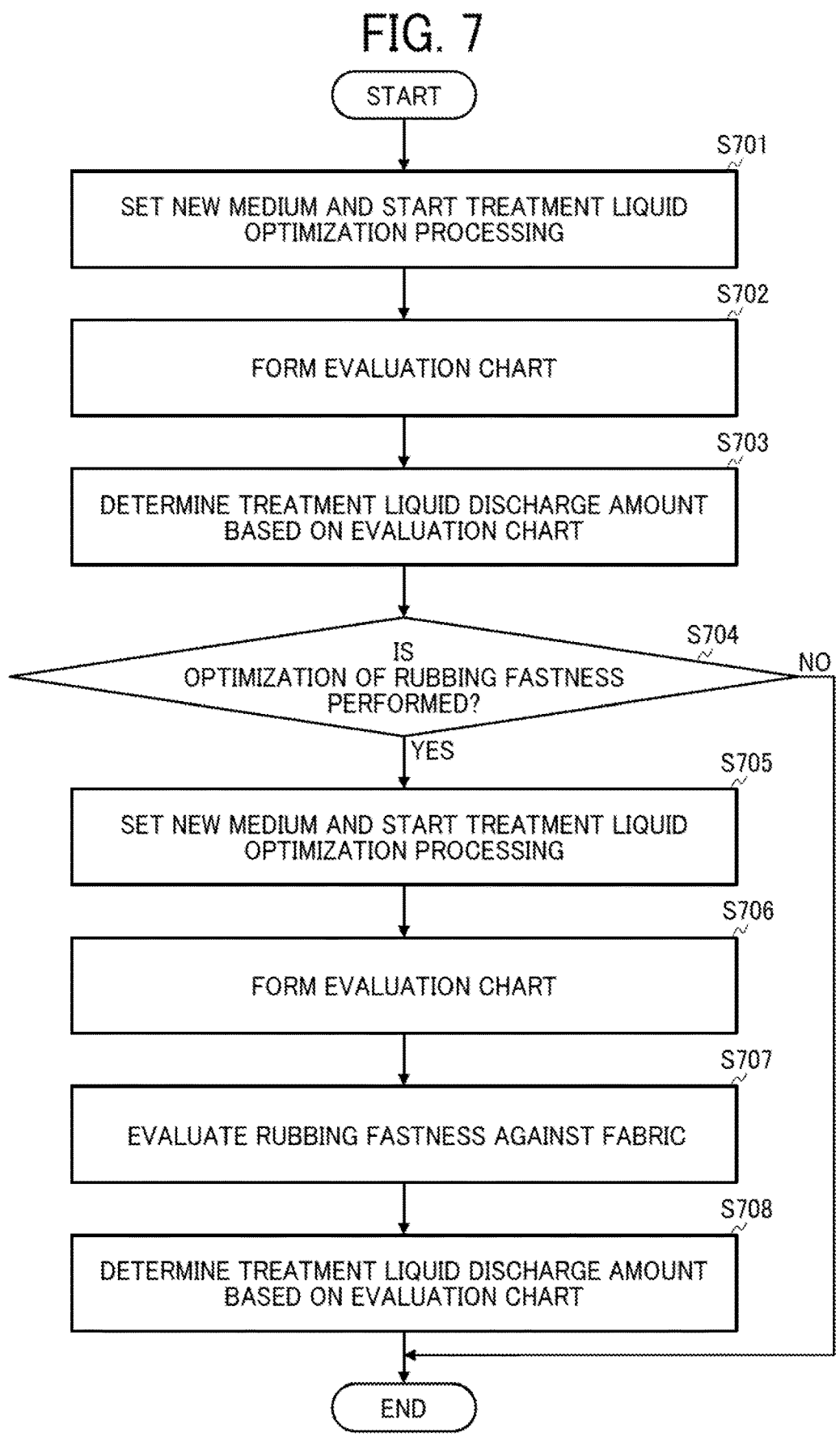
FIG. 7 is a flowchart of a control process executed by a controller according to an embodiment of the present disclosure.

FIG. 7 is a flowchart of the discharge amount setting process of the treatment liquid PL executable in the inkjet printer 100. First, the inkjet printer 100 sets a new fabric Mc on the platen 140 (S701).

Subsequently, the inkjet printer 100 determines the number of outputs in accordance with the operation of a "PRINT" button in the operation panel 150. In the present embodiment, the inkjet printer 100 can select "one sheet" or "two sheets" as the number of outputs. For example, it is assumed that "two sheets" is selected. As a result, the inkjet printer 100 prints the evaluation chart CE illustrated in FIG. 6 on the two sheets of the fabric Mc (S702).

Subsequently, a user visually inspects the evaluation chart CE printed on the fabric Mc, and determines the optimal discharge amount of the treatment liquid PL corresponding to each discharge amount of the color liquid CL based on the degree of coloring of each individual region of the evaluation chart CE. Alternatively, the inkjet printer 100 uses a colorimeter to inspect the evaluation chart CE, and determines the optimal discharge amount of the treatment liquid PL corresponding to each discharge amount of the color liquid CL based on the degree of coloring in each individual region of the evaluation chart CE.

Figure 8:
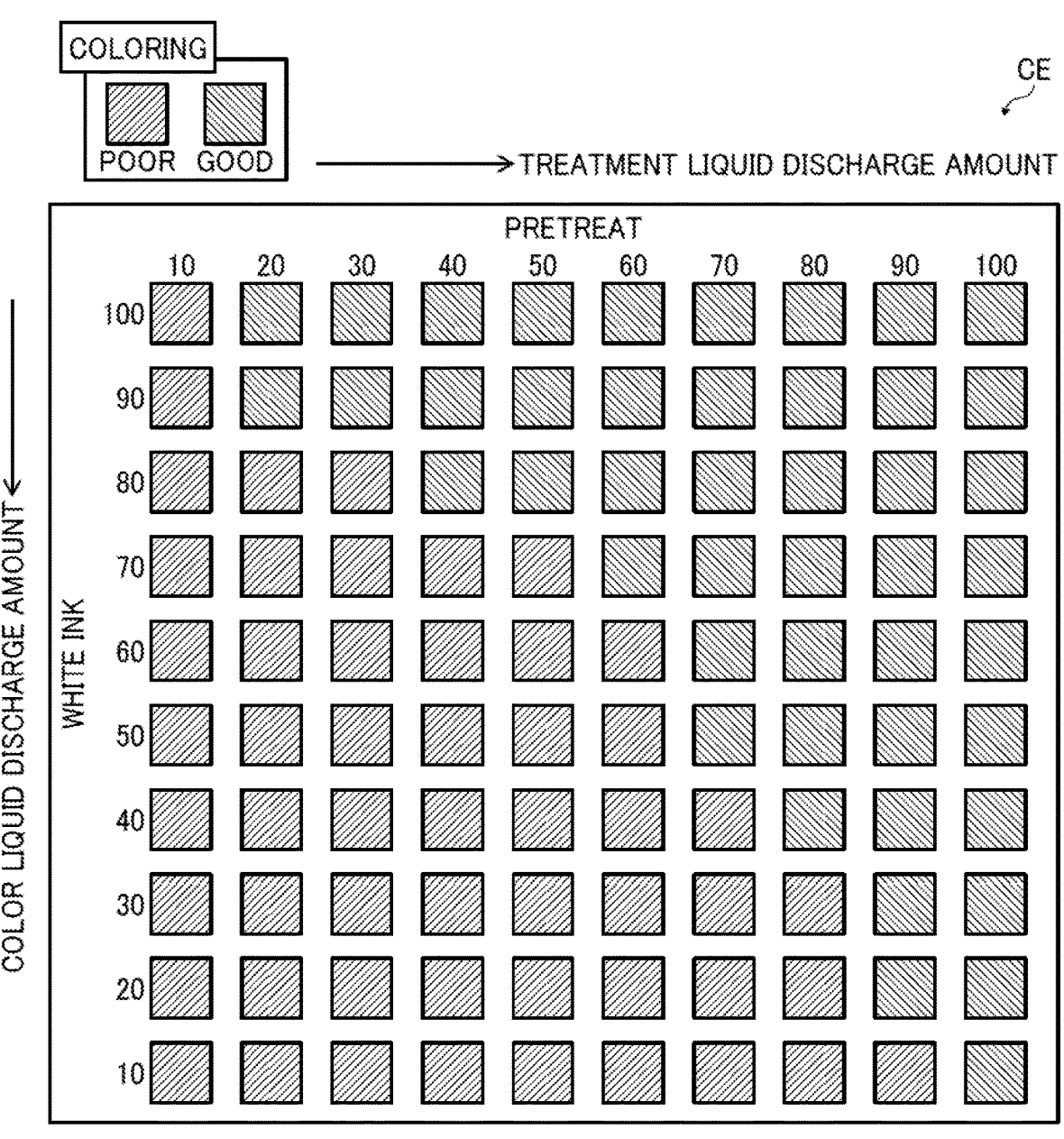
FIG. 8 is a diagram illustrating the evaluation result of the evaluation chart of FIG. 6 for evaluating the discharge amount of treatment liquid.

Thus, the inkjet printer 100 obtains the determination result (S703). FIG. 8 illustrates an example of the determination result of the degree of coloring in each individual region of the evaluation chart CE. As illustrated in FIG. 8, when the discharge amount of the color liquid CL is 100%, the discharge amount of the treatment liquid PL of 20% or more leads to allowable coloring (i.e., the coloring is good).

Similarly, when the discharge amount of the color liquid CL is 90%, the discharge amount of the treatment liquid PL of 20% or more leads to the allowable coloring (i.e., the coloring is good). Similarly, when the discharge amount of the color liquid CL is 80%, the discharge amount of the treatment liquid PL of 40% or more leads to the allowable coloring (i.e., the coloring is good).

Similarly, when the discharge amount of the color liquid CL is 70%, the discharge amount of the treatment liquid PL of 60% or more leads to the allowable coloring (i.e., the coloring is good). Similarly, when the discharge amount of the color liquid CL is 60%, the discharge amount of the treatment liquid PL of 70% or more leads to the allowable coloring (i.e., the coloring is good). Similarly, when the discharge amount of the color liquid CL is 50%, the discharge amount of the treatment liquid PL of 70% or more leads to the allowable coloring (i.e., the coloring is good).

Similarly, when the discharge amount of the color liquid CL is 40%, the discharge amount of the treatment liquid PL of 80% or more leads to the allowable coloring (i.e., the coloring is good). Similarly, when the discharge amount of the color liquid CL is 30%, the discharge amount of the treatment liquid PL of 90% or more leads to the allowable coloring (i.e., the coloring is good). Similarly, when the discharge amount of the color liquid CL is 20%, the discharge amount of the treatment liquid PL of 90% or more leads to the allowable coloring (i.e., the coloring is good). Similarly, when the discharge amount of the color liquid CL is 10%, the discharge amount of the treatment liquid PL of only 100% leads to the allowable coloring (i.e., the coloring is good).

Figure 9:
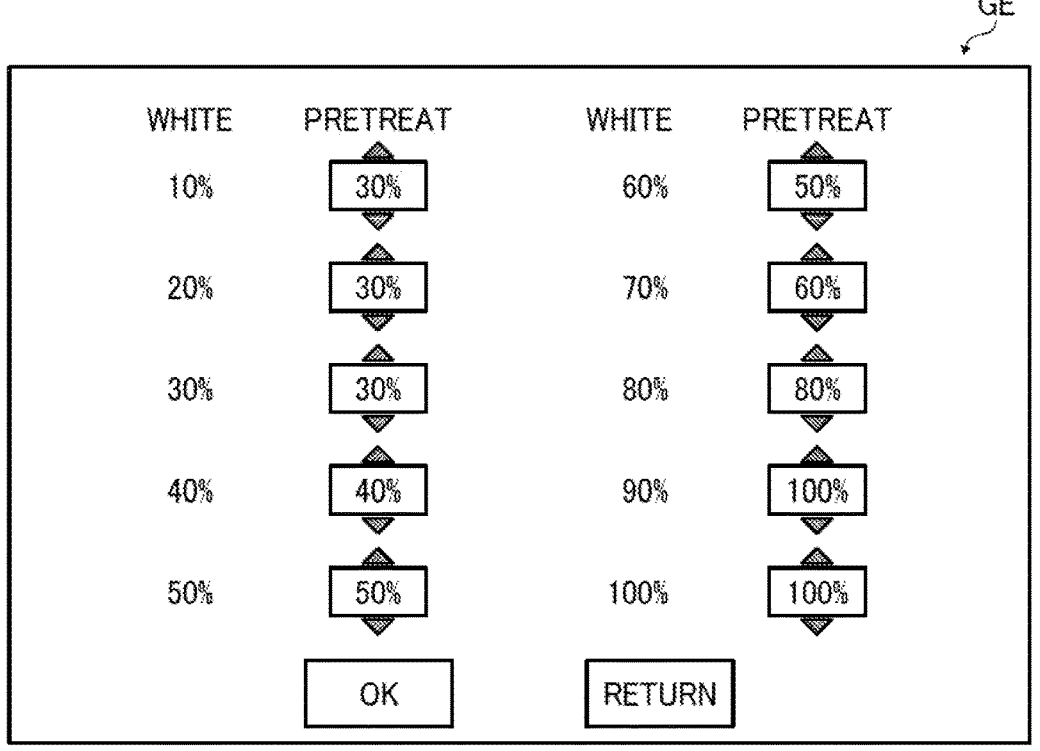
FIG. 9 is a diagram illustrating an interface for setting the discharge amount of treatment liquid according to an embodiment of the present disclosure.

As described above, the coloring depends on the combination of the discharge amount of the color liquid CL and the discharge amount of the treatment liquid PL to be allowable. Accordingly, as illustrated in FIG. 9, the inkjet printer 100 determines the optimal discharge amount of the treatment liquid PL for each discharge amount of the color liquid CL in accordance with setting values in a setting screen GE displayed on the operation panel 150.

Figure 10:
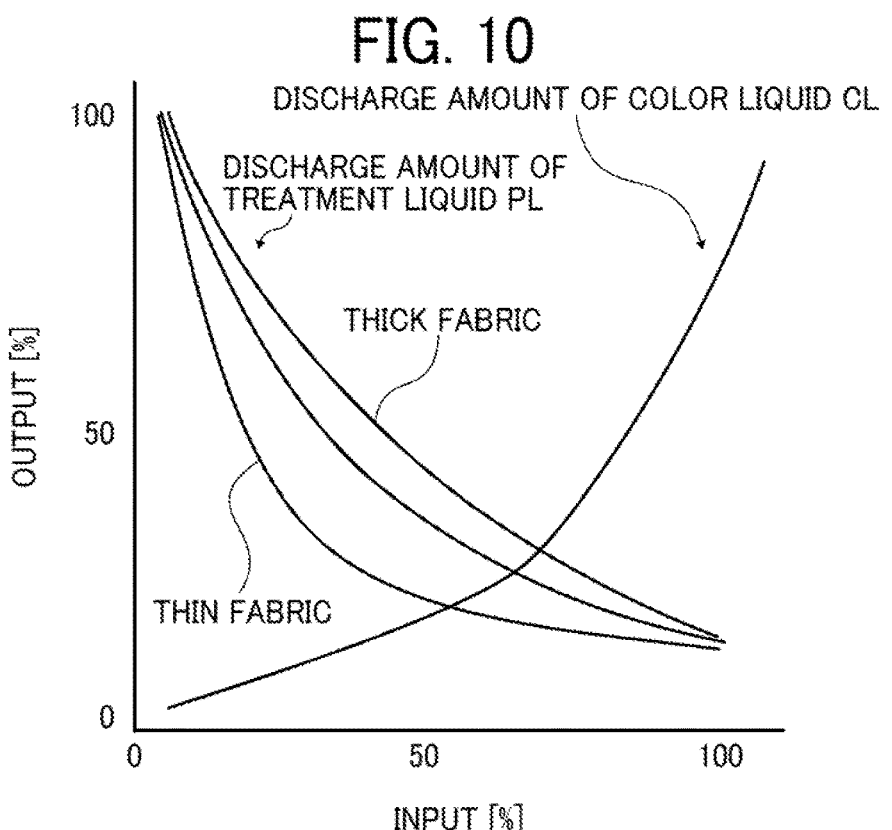
FIG. 10 is a graph illustrating an image of a control process according to an embodiment of the present disclosure.

The above setting will be described in detail with reference to FIG. 10. In the graph of FIG. 10, the horizontal axis represents an example of input of parameters included in the operation instruction information for operating the liquid discharge head 120. The vertical axis represents an example of output of the liquid discharge head 120 derived from the execution data of the image forming process included in the operation instruction information.

As illustrated in FIG. 10, in the image parameter generated by the inkjet printer 100 based on the operation instruction information, when the fabric Mc is thick, the output is set to be higher than the standard. On the other hand, when the fabric Mc is thin, the output is set to be lower than the standard. In this way, the inkjet printer 100 can adjust the discharge amount of the treatment liquid PL with respect to the discharge amount of the color liquid CL.

The description is given below with reference again to FIG. 7. After the inkjet printer 100 determines the optimal combination of the discharge amount of the color liquid CL and the discharge amount of the treatment liquid PL in step S703, the inkjet printer 100 selects whether to optimize the rubbing fastness of the fabric Mc on which the evaluation chart CE is printed (S704). When the inkjet printer 100 determines that the rubbing fastness is not optimized (No in step S704), the inkjet printer 100 ends the process.

Subsequently, the inkjet printer 100 sets a new fabric Mc on the platen 140, determines the number of outputs in accordance with the operation of the "PRINT" button in the operation panel 150, and starts forming a new evaluation chart CE (S705). For example, it is assumed that "two sheets" is selected. As a result, the inkjet printer 100 prints the evaluation chart CE illustrated in FIG. 6 on the two sheets of the fabric Mc (S706).

Then, the inkjet printer 100 performs a rubbing evaluation as a deterioration process on the two sheets of the fabric Mc on which the evaluation chart CE is printed (S707). Alternatively, the rubbing evaluation may be performed by an apparatus other than the inkjet printer 100. In the rubbing evaluation, one sheet of the fabric Mc is washed to evaluate the degree of deterioration of the coloring of the evaluation chart CE formed on the fabric Mc. The inkjet printer 100 evaluates the coloring of the evaluation chart CE on the fabric Mc that has been washed. The portion of the other sheet of the fabric Mc where the evaluation chart CE is formed is rubbed to deteriorate the coloring of the evaluation chart CE due to abrasion. Then, the inkjet printer 100 evaluates the coloring. Based on the degree of coloring of the evaluation chart CE subjected to the deterioration process, the inkjet printer 100 determines the relation between the discharge amount of the treatment liquid PL and the discharge amount of the color liquid CL, and evaluates the discharge amount of the treatment liquid PL based on the coloring of the evaluation chart CE in consideration of the fastness (S708). The evaluation method in step S708 is the same as the method described in step S703.

The inkjet printer 100 evaluates the coloring of the evaluation chart CE based on the rubbing evaluation in step S707, and determines the optimal discharge amount of the treatment liquid PL for each discharge amount of the color liquid CL in the setting screen GE displayed on the operation panel 150 (see FIG. 9).

As described above with reference to the flowchart of FIG. 7, the process of optimizing the discharge amount of the treatment liquid PL is completed. Subsequently, the inkjet printer 100 sets the same type of fabric Mc used in the process of optimizing the discharge amount of the treatment liquid PL on the platen 140, and forms a predetermined image on the fabric Mc. The drive waveform of the liquid discharge head 120 is adjusted by the process of optimizing the discharge amount of the treatment liquid PL. Accordingly, the drive amount (i.e., the discharge amount of the treatment liquid PL) in the liquid discharge operation of the liquid discharge head 120 determined according to the image data included in the operation instruction information is in a state in which an operation different from the initial value is performed based on the setting described with reference to FIG. 6. In other words, when the discharge amount of the treatment liquid PL is adjusted based on the evaluation chart CE, the discharge amount of the treatment liquid PL is different from the initial value.

When the type of fabric Mc is changed, the process illustrated in FIG. 7 is executed again using a new type of fabric Mc. As described above, the inkjet printer 100 executes the discharge amount setting process to determine the optimal discharge amount of the treatment liquid PL in accordance with the type of fabric Mc. The optimal discharge amount of the treatment liquid PL can lead to a desired coloring in accordance with the type of fabric Mc.

Second Embodiment

Figure 11:
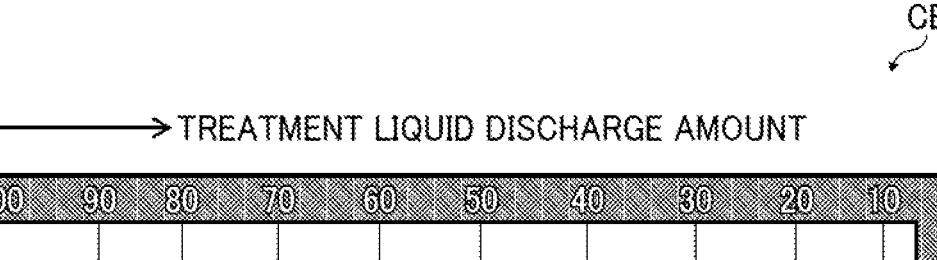
FIG. 11 is a diagram illustrating another evaluation chart according to an embodiment of the present disclosure.
Figure 12:
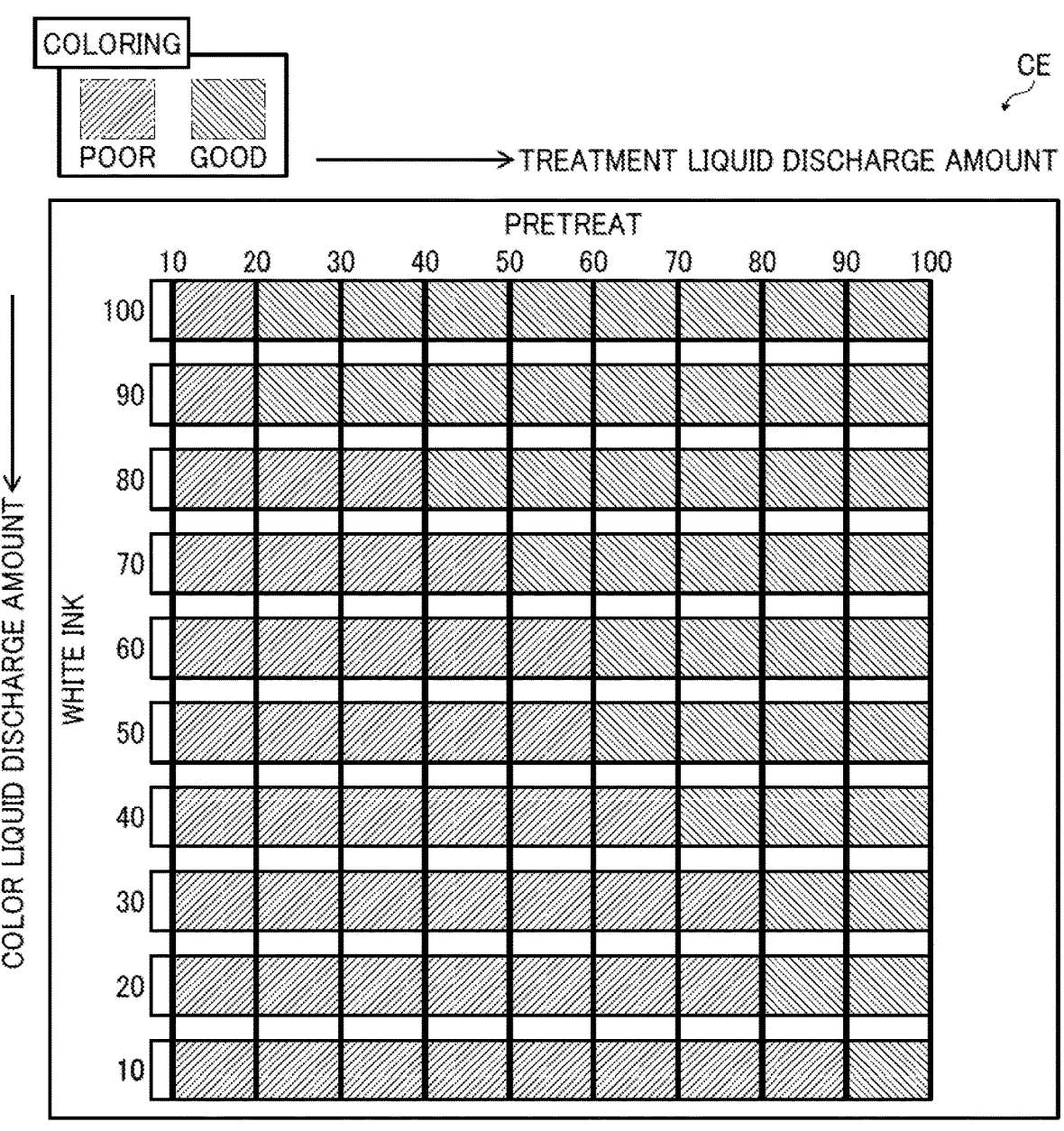
FIG. 12 is a diagram illustrating the evaluation result of the evaluation chart of FIG. 11 for evaluating the discharge amount of treatment liquid.
Figure 13:
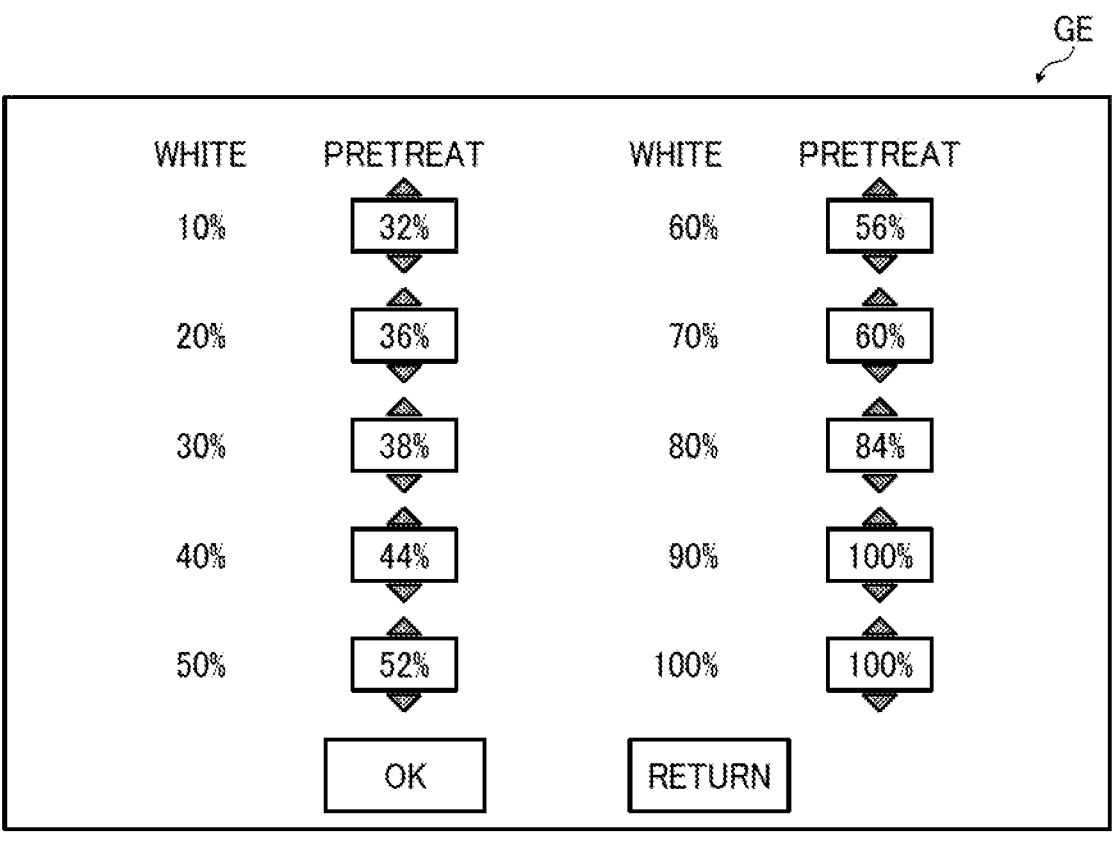
FIG. 13 is a diagram illustrating another interface for setting the discharge amount of treatment liquid according to an embodiment of the present disclosure.

A discharge amount setting process according to a second embodiment of the present disclosure will be described below with reference to FIGS. 11 and 12. The discharge amount setting process can be executed in the inkjet printer 100 as the liquid discharge apparatus according to embodiments of the present disclosure. Unlike the evaluation chart CE of FIG. 6 according to the first embodiment, FIG. 11 illustrates an evaluation chart CE in which the discharge amount of the treatment liquid PL is changed in increments of 2% in each of band patterns. FIG. 12 corresponds to FIG. 8 according to the first embodiment. FIG. 13 corresponds to FIG. 9 according to the first embodiment.

As illustrated in FIG. 13, in the second embodiment, the discharge amount of the treatment liquid PL can be determined using the result of forming an image in the individual region with the discharge amount of the treatment liquid PL divided in increments finer than that of the first embodiment in the evaluation chart CE. Such a setting process leads to the enhancement of coloring, the prevention of image quality abnormality, and the optimization of washing and rubbing fastness more finely.

Aspects of the present disclosure are, for example, as follows.
Aspect 1
A liquid discharge apparatus includes a liquid discharge head to discharge a liquid onto a predetermined position of a medium, a medium moving unit to relatively move the medium with respect to the liquid discharge head, and a controller to control operations of the liquid discharge head and the medium moving unit. There are multiple liquid discharge heads. Among the multiple liquid discharge heads, one liquid discharge head is a color liquid discharge unit that discharges a color liquid to paint the medium in a specific color, and another liquid discharge head is a treatment liquid discharge unit that discharges a treatment liquid onto a region of the medium to be painted in the specific color. The treatment liquid exerts a predetermined effect to affect a degree of coloring. The controller includes an evaluation chart generation unit that controls the liquid discharge head to generate an evaluation chart in which both the discharge amount of the color liquid and the discharge amount of the treatment liquid are changed in the region of the medium, a treatment liquid discharge amount setting unit that sets the discharge amount of the treatment liquid with respect to a specific discharge amount of the color liquid, which is determined according to the degree of coloring in the evaluation chart, and a discharge controller that controls the operation of the treatment liquid discharge unit based on the setting.

In other words, a liquid discharge apparatus includes multiple liquid discharge heads, a medium mover, and circuitry. The multiple liquid discharge heads discharge a liquid onto a medium. The multiple liquid discharge heads include a first liquid discharge head to discharge a treatment liquid onto a region of the medium and a second liquid discharge head to discharge a color liquid onto the region of the medium to paint the region of the medium, on which the treatment liquid is applied by the first liquid discharge head, in a predetermined color. A coloring of the predetermined color is affected by the treatment liquid. The medium mover moves at least one of the multiple liquid discharge heads or the medium relative to each other. The circuitry causes the first liquid discharge head and the second liquid discharge head to form an evaluation chart on the region of the medium. The evaluation chart includes patterns different in a combination of a first discharge amount of the treatment liquid and a second discharge amount of the color liquid. Further, the circuitry performs a setting of the first discharge amount of the treatment liquid with respect to the second discharge amount of the color liquid according to the coloring of the predetermined color in the evaluation chart, and causes the second liquid discharge head to discharge the treatment liquid onto the region of the medium based on the setting.

Aspect 2

In the liquid discharge apparatus according to Aspect 1, the controller controls the liquid discharge head so that the evaluation chart generation unit generates the evaluation chart according to the type of the medium, and the discharge controller controls the operations of the treatment liquid discharge unit and the color liquid discharge unit based on the setting determined by the type of the medium.

In other words, the circuitry further causes the first liquid discharge head and the second liquid discharge head to form the evaluation chart according to a type of the medium, and causes the first liquid discharge head and the second liquid discharge head to form an image on the medium based on the setting according to the type of the medium.

Aspect 3

In the liquid discharge apparatus according to Aspect 2, the type of the medium includes a thickness of the medium.

Aspect 4

The liquid discharge apparatus according to any one of Aspect 1 to 3, further includes a colorimeter to measure the coloring of the predetermined color in the evaluation chart to determine the first discharge amount of the treatment liquid with respect to the second discharge amount of the color liquid.

Aspect 5

The liquid discharge apparatus according to any one of Aspect 1 to 4, further includes an operation panel to display a setting screen on which the combination of the first discharge amount of the treatment liquid and the second discharge amount of the color liquid is changeably displayed.

Aspect 6

The liquid discharge apparatus according to any one of Aspects 1 or 5, the setting is determined according to the degree of coloring in the evaluation chart after a predetermined deterioration process for deteriorating the coloring is performed on the medium, on the region of which the evaluation chart is generated, based on a result of the deterioration process.

In other words, the circuitry is further causes the first liquid discharge head and the second liquid discharge head to form an image on the medium based on the setting according to the coloring of the patterns of the evaluation chart to which a deterioration process is performed.

Aspect 7

The liquid discharge apparatus according to any one of Aspects 1 to 6, the specific color (predetermined color) is white.

Aspect 8

In the liquid discharge apparatus according to any one of Aspects 1 to 7, the evaluation chart includes multiple rectangular patterns arranged in two dimensions. The first discharge amount of the treatment liquid is changed in the multiple rectangular patterns in one of the two dimensions, and the second discharge amount of the color liquid liquid is changed in the multiple rectangular patterns in another of the two dimensions.

Aspect 9

In the liquid discharge apparatus according to any one of Aspects 1 to 7, the evaluation chart includes multiple band patterns arranged in an arrangement direction. The first discharge amount of the treatment liquid is changed in each of the multiple band patterns in a longitudinal direction orthogonal to the arrangement direction, and the second discharge amount of the color liquid liquid is changed in the multiple band patterns in the arrangement direction.

As described above, according to one aspect of the present disclosure, a liquid discharge apparatus can be provided that optimizes the degree of adhesion of liquid adhered to a medium and enhances the fastness over time in a process of discharging liquid onto various types of media.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:

multiple liquid discharge heads to discharge a liquid onto a medium, the multiple liquid discharge heads including:

a first liquid discharge head to discharge a treatment liquid onto a region of the medium;

a second liquid discharge head to discharge a color liquid onto the region of the medium to paint the region of the medium, on which the treatment liquid is applied by the first liquid discharge head, in a predetermined color, a coloring of which is affected by the treatment liquid; and a medium mover to move at least one of the multiple liquid discharge heads or the medium relative to each other; and circuitry configured to:

cause the first liquid discharge head and the second liquid discharge head to form an evaluation chart on the region of the medium, the evaluation chart including patterns different in a combination of a first discharge amount of the treatment liquid and a second discharge amount of the color liquid;

perform a setting of the first discharge amount of the treatment liquid with respect to the second discharge amount of the color liquid according to the coloring of the predetermined color in the evaluation chart; and cause the second liquid discharge head to discharge the treatment liquid onto the region of the medium based on the setting.

2. The liquid discharge apparatus according to claim 1, wherein the circuitry is further configured to:

cause the first liquid discharge head and the second liquid discharge head to form the evaluation chart according to a type of the medium; and cause the first liquid discharge head and the second liquid discharge head to form an image on the medium based on the setting according to the type of the medium.

3. The liquid discharge apparatus according to claim 2, wherein the type of the medium includes a thickness of the medium.

4. The liquid discharge apparatus according to claim 1, further comprising a colorimeter to measure the coloring of the predetermined color in the evaluation chart to determine the first discharge amount of the treatment liquid with respect to the second discharge amount of the color liquid.

5. The liquid discharge apparatus according to claim 1, further comprising an operation panel to display a setting screen on which the combination of the first discharge amount of the treatment liquid and the second discharge amount of the color liquid is changeably displayed.

6. The liquid discharge apparatus according to claim 1, wherein the circuitry is further configured to cause the first liquid discharge head and the second liquid discharge head to form an image on the medium based on the setting according to the coloring of the patterns of the evaluation chart to which a deterioration process is performed.

7. The liquid discharge apparatus according to claim 1, wherein the predetermined color is white.

8. The liquid discharge apparatus according to claim 1, wherein the evaluation chart includes multiple rectangular patterns arranged in two dimensions, the first discharge amount of the treatment liquid is changed in the multiple rectangular patterns in one of the two dimensions, and the second discharge amount of the color liquid is changed in the multiple rectangular patterns in another of the two dimensions.

9. The liquid discharge apparatus according to claim 1, wherein the evaluation chart includes multiple band patterns arranged in an arrangement direction, the first discharge amount of the treatment liquid is changed in each of the multiple band patterns in a longitudinal direction orthogonal to the arrangement direction, and the second discharge amount of the color liquid is changed in the multiple band patterns in the arrangement direction.

* * * * *